UNITED STATES PATENT OFFICE.

FRIEDRICH LUX, OF LUDWIGSHAFEN-ON-THE-RHINE, BAVARIA, GERMANY.

COMPOUND FOR THE DESULPHURATION OF LIQUIDS AND GASES.

SPECIFICATION forming part of Letters Patent No. 248,833, dated October 25, 1881.

Application filed July 13, 1881. (No specimens.)

*To all whom it may concern:*

Be it known that I, FRIEDRICH LUX, a subject of the Grand Duke of Hesse, residing at Ludwigshafen-on-the-Rhine, in the Palatinate, in the Kingdom of Bavaria, have invented certain new and useful Improvements in Compounds for Desulphuration of Liquids and Gases; and I do hereby declare that the following is a full, clear, and exact description of the invention, which will enable others skilled in the art to which it appertains to use the same.

Heretofore native sesquioxide of iron and hydrated peroxide of iron have been used in desulphurating liquids and gases, especially in desulphurating illuminating-gases. These said chemicals have been found to be deficient in their action, inasmuch as in the beginning of the desulphurating process their purifying or desulphurizing qualities would not come into full action, and the results obtained were imperfect at that stage of the process. These qualities would come with full action by degrees only, after the chemicals had become fluxed, and even their full action would not be such as to be in proportion to the iron they contained.

The object of my invention is to overcome the defects heretofore existing and obtain a more perfect desulphuration of the liquid or gas under treatment at the beginning of and throughout the entire process; and to this end the invention consists in preparing a desulphurizing agent or mass containing, besides the iron, a certain percentage of alkalies. In this said mass the hydrated peroxide of iron is contained in a molecular state in consequence of fusion and lixiviation.

In preparing this mass I use minerals which contain hydrated peroxide of iron and hydrate of alumina, (such as bauxite, for instance, a mineral found near the city of Baux, in Southern France,) and I fuse the said mineral with carbonate of soda, and lixiviate the fused mass with water. By this process the alumina is extracted, and the hydrated peroxide of iron will be left in a state of finest molecular division. The lixiviation is continued until the remaining hydrated peroxide of iron will contain, in an air-dried state, about five per cent. (more or less) of carbonate of soda. The quantity of carbonate of soda applied depends on the hydrate of alumina—that is to say, three equivalents of carbonate of soda are used with one equivalent of hydrate of alumina.

$$Al_2O_3 3H_2O + 3Na_2Co_3 = \left.\begin{matrix}Al_2\\Na_6\end{matrix}\right\} O_6 + 3H_2O + 3Co_2.$$

This is equivalent to three hundred and eighteen parts of carbonate of soda, by weight, being used with one hundred and fifty-six and four-tenths parts, by weight, of hydrate of alumina, contained in bauxite; or, approximately, for one part, by weight, of hydrate of alumina, two parts, by weight, of carbonate of soda must be used. The lixiviation will be stopped if the lixiviated solution flowing from the tank or other receptacle shows only 1° Baumé. The mass remaining in the tank will then contain five per cent. of carbonate of soda after it has become air-dried.

In the manufacture of preparations of alumina, (such as sulphate of alumina, alum, hydrate of alumina, &c.,) there remains, when treating the crude mass in the usual manner, a residue containing, besides the hydrated peroxide of iron and the carbonate of soda, other ingredients, such as clay or sand. This residue would serve the purpose of my desulphurating mass, and it would not be necessary to elutriate or wash the sand before using the mass for the desulphurizing process, as it would neither retard nor accelerate the same, and the acting elements, which would in this instance consist of about sixty to seventy per cent. of hydrated peroxide of iron and about five per cent. of carbonate of soda, would act with the same efficiency in desulphurating liquids or gases as when forming the only component parts of a mass. The main point to be observed is to add to the hydrated peroxide of iron, which is in a molecular condition, the proper proportion of carbonate of soda, so that the mass will work energetically from the beginning of the purifying process.

The mass which I propose to apply to practical use will be composed of the before-mentioned ingredients, in about the following proportions: hydrated peroxide of iron, sixty-five per cent.; carbonate of soda, five per cent.; sand or clay and moisture, thirty per cent.

This mass will be obtained best and cheapest in the manufacture of preparations of alumina, and especially when using bauxite in such manufacture.

Having thus described my invention, what I claim is—

The herein-described compound, used for the desulphuration of liquids and gases, more particularly illuminating-gas, consisting of artificial peroxide of iron combined with alkalies, substantially as before set forth.

In testimony whereof I have signed my name to this specification in the presence of two subscribing witnesses.

FRIEDRICH LUX.

Witnesses:
 ROBERT R. SCHMIDT,
 BERTHOLD ROI.